United States Patent
Schwindt

(10) Patent No.: US 11,328,615 B2
(45) Date of Patent: *May 10, 2022

(54) ROUTE PLANNING AND MOVEMENT OF AN AIRCRAFT ON THE GROUND BASED ON A NAVIGATION MODEL TRAINED TO INCREASE AIRCRAFT OPERATIONAL EFFICIENCY

(71) Applicant: GE Aviation Systems LLC, Grand Rapids, MI (US)

(72) Inventor: Stefan Alexander Schwindt, Cheltenham (GB)

(73) Assignee: GE Aviation Systems LLC, Grand Rapids, MI (US)

(*) Notice: Subject to any disclaimer, the term of this patent is extended or adjusted under 35 U.S.C. 154(b) by 126 days.

This patent is subject to a terminal disclaimer.

(21) Appl. No.: 16/738,643

(22) Filed: Jan. 9, 2020

(65) Prior Publication Data

US 2020/0152071 A1 May 14, 2020

Related U.S. Application Data

(63) Continuation of application No. 15/830,310, filed on Dec. 4, 2017, now Pat. No. 10,535,276.

(51) Int. Cl.
*G08G 5/06* (2006.01)
*G08G 5/00* (2006.01)
(Continued)

(52) U.S. Cl.
CPC ............ *G08G 5/065* (2013.01); *G05D 1/0011* (2013.01); *G05D 1/0202* (2013.01);
(Continued)

(58) Field of Classification Search
CPC .... G08G 5/065; G08G 5/0021; G08G 5/0043; G08G 5/045; G05D 1/0011; G05D 1/0202
(Continued)

(56) References Cited

U.S. PATENT DOCUMENTS 8,620,493 B2 12/2013 Hughes et al.
8,935,018 B2 1/2015 Hughes et al.
(Continued)

OTHER PUBLICATIONS

Non-Final Office Action received for U.S. Appl. No. 15/830,310 dated Apr. 15, 2019, 19 pages.
(Continued)

*Primary Examiner* — Gertrude Arthur Jeanglaude
(74) *Attorney, Agent, or Firm* — Amin, Turocy & Watson, LLP

(57) ABSTRACT

Route planning and movement of an aircraft on the ground based on a navigation model trained to improve aircraft operational efficiency is provided herein. A system comprises a memory that stores executable components and a processor, operatively coupled to the memory, that executes the executable components that comprise an assessment component, a sensor component, and a route planning component. The assessment component accesses runway data, taxiway data, and gate configuration data associated with an airport. The sensor component collects, from a plurality of sensors, sensor data related to performance data of an aircraft and respective conditions of the runway, the taxiway, and the gate configuration data. The route planning component employs a navigation model that is trained to analyze the sensor data, the runway data, the taxiway data, and the gate configuration data, and generate a taxiing protocol to navigate the aircraft to improve aircraft operational efficiency.

20 Claims, 10 Drawing Sheets

(51) Int. Cl.
  *G05D 1/00*  (2006.01)
  *G05D 1/02*  (2020.01)
  *G08G 5/04*  (2006.01)
(52) U.S. Cl.
  CPC ......... *G08G 5/0021* (2013.01); *G08G 5/0043* (2013.01); *G08G 5/045* (2013.01)
(58) Field of Classification Search
  USPC .......................................................... 701/120
  See application file for complete search history.

(56) References Cited

U.S. PATENT DOCUMENTS

| | | | |
|---|---|---|---|
| 9,495,879 B2 | 11/2016 | Depape et al. | |
| 10,535,276 B2 * | 1/2020 | Schwindt | ............... G08G 5/065 |
| 2008/0270020 A1 | 10/2008 | Raab | |
| 2013/0131888 A1 | 5/2013 | Nutaro et al. | |
| 2013/0297102 A1 | 11/2013 | Hughes et al. | |
| 2015/0266565 A1 | 9/2015 | Cox et al. | |
| 2017/0032687 A1 | 2/2017 | Lamkin et al. | |

OTHER PUBLICATIONS

Office Action received for Canadian Patent Application Serial No. 3024983 dated Oct. 21, 2019, 5 pages.

* cited by examiner

ROUTE PLANNING AND MOVEMENT OF AN AIRCRAFT ON THE GROUND BASED ON A NAVIGATION MODEL TRAINED TO INCREASE AIRCRAFT OPERATIONAL EFFICIENCY

CROSS REFERENCE TO RELATED APPLICATIONS

This application is a continuation of, and claims the priority of, U.S. patent application Ser. No. 15/830,310 (now U.S. Pat. No. 10,535,276), filed Dec. 4, 2017, and entitled "ROUTE PLANNING AND MOVEMENT OF AN AIRCRAFT ON THE GROUND BASED ON A NAVIGATION MODEL TRAINED TO INCREASE AIRCRAFT OPERATIONAL EFFICIENCY," the entirety of which is expressly incorporated herein by reference.

TECHNICAL FIELD

The subject disclosure relates generally to route planning and movement and, more specifically, to route planning and movement of an aircraft on the ground based on a navigation model trained to increase aircraft operational efficiency.

BACKGROUND

Flight management systems are employed within an aircraft cockpit to perform complex operations and/or complex calculations that facilitate navigation of an aircraft during on-the-ground operations and in-flight operations. As it relates to on-the-ground operations, the flight management systems can be utilized to assist the pilot to route the aircraft around the airport (e.g., navigate to a gate or terminal after landing). The route provided, however, is a "shortest path" between a starting location and an ending location. The shortest path, however, does not consider "wear and tear" on the aircraft, an amount of fuel and other resources consumed, and/or passenger convenience and safety.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An aspect relates to a system that can comprise a memory and a processor. The memory can store executable components and the processor can be operatively coupled to the memory and can execute the executable components. The executable components can comprise an assessment component that accesses runway data, taxiway data, and gate configuration data associated with an airport and aircraft technical data and specifications. The executable components can also comprise a sensor component that can collect sensor data from a plurality of sensors. The sensor data can relate to performance data of an aircraft and respective conditions of the runway data, the taxiway data, and the gate configuration data. Further, the executable components can comprise a route planning component that can employ a navigation model that is trained to analyze the sensor data, the runway data, the taxiway data, and the gate configuration data, and generate a taxiing protocol to navigate the aircraft within the airport to improve aircraft operational efficiency associated with conservation of fuel, decreased brake wear, or combinations thereof.

According to another aspect is a method that can comprise determining, by a system operatively coupled to a processor, information related to an airdrome. The information can comprise first data associated with a runway of the airdrome, second data associated with a taxiway of the airdrome, third data associated with a gate configuration of the airdrome, and fourth data associated with aircraft technical data. The method can also comprise obtaining, by the system, sensor data from one or more sensors. The one or more sensors can comprise a first sensor that monitors performance data of an aircraft, a second sensor that monitors a first condition of the runway, a third sensor that monitors a second condition of the taxiway, and a fourth sensor that monitors a third condition of the gate configuration. Further, the method can comprise generating, by the system, a taxiing protocol based on a navigation model that is trained based on the information and the sensor data. The taxiing protocol can increase an operational efficiency of the aircraft, wherein the operational efficiency comprises fuel conservation, brake wear mitigation, or combinations thereof.

Another aspect relates to a computer readable storage device comprising executable instructions that, in response to execution, cause a system comprising a processor to perform operations. The operations can comprise accessing runway data, taxiway data, and terminal configuration data associated with an airport. The operations can also comprise obtaining sensor data from one or more sensors. The sensor data can relate to performance data of an aircraft and respective conditions of a runway, a taxiway, and a defined terminal. Further, the operations can comprise training a model based on the sensor data, the runway data, the taxiway data, and the terminal configuration data. In addition, the operations can comprise determining a taxiing protocol. The aircraft can be navigated within the airport based on the taxiing protocol. Further, the taxiing protocol can increase an operational efficiency of the aircraft based on mitigation of brake wear, fuel conservation, or both mitigation of brake wear and fuel conservation.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Various aspects provided herein relate to navigation after an aircraft has landed, or during preparation for air flight. In an example, the various aspects can facilitate automatic selection of a runway exit point (e.g., a taxiway) based on actual landing/deceleration progress. For example, based on a landing progress (e.g., a long landing) and actual deceleration (e.g., dry, wet, contaminated runway), the various aspects can dynamically calculate which exit should be taken for a defined destination gate. In an example, braking performance for an original taxiway can be increased to utilize a planned taxiway, or a different taxiway can be chosen to minimize brake wear.

According to one or more aspects, performance-based optimization of routes (rather than shortest path) can be performed as discussed herein. For example, routes can be calculated to a destination gate (or to a runway) by performance of the aircraft, not based on the shortest path. In some implementations, performance can include consideration of accelerations and/or decelerations that can impact fuel consumption, inertia, and other operating parameters.

Further, automatic routing as discussed herein can utilize awareness of unavailable taxiways through use of digital datalinks and/or sensors. For example, digital datalinks provided by airport and/or sensors (built in or provided via a datalink) can be utilized to identify closed and/or unavailable taxiways and to route an optimal path utilizing only available taxiways (e.g., avoid a "traffic jam").

Figure 1:
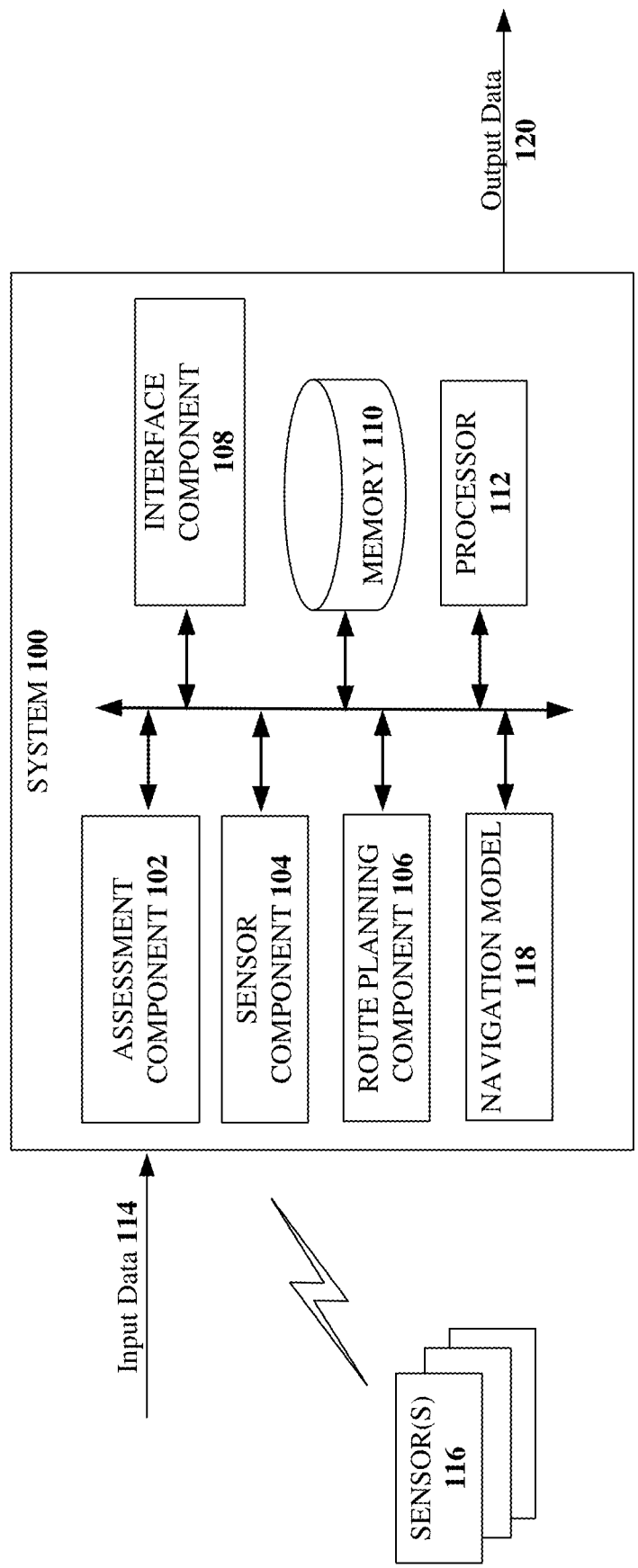
FIG. 1 illustrates an example, non-limiting, system for aircraft on-the-ground navigation in accordance with one or more embodiments described herein.

FIG. 1 illustrates an example, non-limiting, system 100 for aircraft on-the-ground navigation in accordance with one or more embodiments described herein. For example, the navigation can be from a gate (e.g., a boarding gate) to a runway. In another example, the navigation can be from the runway to the gate or terminal. In a further example, the navigation can be to other locations, such as from the gate to a deicing location, then to the runway. Further, other locations can be utilized for the routing and the disclosed aspects are not limited to routing to/from a gate and/or a runway.

The system 100 can comprise an assessment component 102, a sensor component 104, a route planning component 106, an interface component 108, at least one memory 110, and at least one processor 112. The assessment component 102 can receive and/or can access input data 114, which can comprise runway data, taxiway data, and gate configuration data associated with an airdrome (e.g., an airport, general aviation airfields, large commercial airports, military airbases, and so on). For example, the runway data can include information related to a runway that an aircraft is expected, or is scheduled, to utilize. The runway data can also include information related to other runways of the airport. The taxiway data can include information related to one or more taxiways of the airport, including at least one taxiway the aircraft is expected to use. The gate configuration data can include information related to respective configurations of one or more airports. The assessment component 102 can also receive input data 114 that comprises aircraft technical data and specifications (e.g., size, weight, engine torque, and so on).

The sensor component 104 can collect sensor data from a plurality of sensors 116 that can be associated with the aircraft or that can be located remote from the aircraft. One or more sensors of the plurality of sensors 116 can obtain sensor data related to performance data of the aircraft. For example, the sensor data can include a speed of the aircraft, a braking action associate with the aircraft, and/or an aircraft deceleration. Further, one or more sensors of the plurality of sensors 116 can obtain sensor data related to respective conditions of the runway data, the taxiway data, and the gate configuration data.

One or more sensors of the plurality of sensors 116 can be included, at least partially, in the system 100. Other sensors of the plurality of sensors 116 can be located remote from, and in communication with, the system 100 (and/or other systems). According to some implementations, one or more sensors of the plurality of sensors 116 can obtain information related to conditions of an airport, including runway conditions, weather conditions, and/or other conditions. Additionally, the airport runway data can include information related to a current or anticipated condition of the runway. The condition can include weather conditions, usage conditions (e.g., usage by other aircraft, personnel, service vehicles, and so on), or other conditions (e.g., scheduled maintenance, unscheduled closures).

The route planning component 106 can employ a navigation model 118 that can be trained to analyze the sensor data, the runway data, the taxiway data, and/or the gate configuration data. Based on the data and the navigation model 118, the route planning component 106 can generate a taxiing protocol to navigate the aircraft within the airport to improve aircraft operational efficiency. The taxiing protocol can navigate the aircraft from a current location to a target location. For example, if the aircraft has landed, the navigation can be from the runway to an assigned gate. In another example, if the aircraft is scheduled to take off, the navigation can be from the gate to the assigned runway.

For example, airports can comprise one or more taxiways, which are paths that connect runways with other areas, such as, aprons, hangers, gates, terminals, and so on. Taxiways usually have various speed limits for safety purposes. Some airports can have high-speed, or rapid-exit, taxiways that can allow the aircraft to leave the runway at higher speeds than other taxiways allow. Accordingly, in some implementations, to conserve fuel, the route planning component 106 can utilize a rapid-exit taxiway after landing so that momentum during landing can be utilized to turn onto the rapid-exit taxiway (e.g., aircraft does not need to decelerate quickly to exit the runway, which can conserve fuel). For example, for jet engines, spooling up the turbine can use a lot of fuel. Therefore, when landing and an exit is taken onto a high-speed taxiway, the aircraft can use the speed from landing, which can also mitigate brake wear. According to some implementations, aerodynamic models can be employed by the route planning component 106. In an example, the use of reverse thrust and/or brakes can be mitigated (e.g., spoilers can be utilized as speed brakes) based on the aerodynamic models. In some implementations, depending on the airport layout, it could be more fuel efficient and less brake wear to roll all the way out and use drag to bleed off speed, which can be determined through the use of aerodynamic models.

Information related to the taxiing protocol can be output by the interface component 108 as output data 120, which can include audible and/or visual data. According to some implementations, the interface component 108 can be a component of the system 100. However, according to some implementations, the interface component 108 can be separate from the system 100, but in communication with the system 100. For example, the interface component 108 can be associated with a device co-located within the system (e.g., within a cockpit of an aircraft). In another example, the interface component 108 can be included in a device located remote from the system and associated with a pilot or other entity. For example, the device can be a mobile phone, a tablet computer, a laptop computer, and other computing devices.

To determine the taxiing protocol, the route planning component 106 can attempt to improve aircraft operational efficiency. According to some implementations, the route planning component 106 can factor required time of arrival at a gate during the generation of the taxiing protocol. For example, the route planning component 106 can factor aircraft weight, thrust, and fuel consumption during the generation of the taxiing protocol. In another example, the route planning component 106 can factor airport runway and weather conditions when generating the taxiing protocol.

In another example, the route planning component 106 can utilize a time for take-off and a current traffic condition of the airport to generate the route. In an example, the route planning component 106 can indicate that the aircraft should remain at a terminal until a specified time to avoid traffic jams along the taxiways. In some implementations, the route planning component 106 can attempt to move the aircraft from the terminal to the runway (and vice versa) with a minimal number of stops and/or locations where the aircraft would have to slow down. In another example, the route planning component 106 can chose a route to maintain the momentum from landing the aircraft and/or such that no further (or minimal) accelerations are needed (e.g., minimize stops during the route from the taxiway to the terminal area).

According to some implementations, the system 100 (e.g., through the interface component 108) can provide an indication, such as a warning, to indicate that the aircraft will not make it to the runway on time (e.g., based on the navigation model 118) and, therefore, a different time slot should be requested from the traffic control tower. In an implementation, the system 100 can automatically request a different time slot.

Although discussed herein with respect to a single aircraft, in accordance with some implementations, the system 100 can be configured to optimize routes and/or movement of a multitude of aircraft. In an example, the system 100 can be utilized with all aircraft within the airport or a subset of aircraft in the airport.

The at least one memory 110 can be operatively coupled to the at least one processor 112. The at least one memory 110 can store computer executable components and/or computer executable instructions. The at least one processor 112 can facilitate execution of the computer executable components and/or the computer executable instructions stored in the at least one memory 110. The term "coupled" or variants thereof can include various communications including, but not limited to, direct communications, indirect communications, wired communications, and/or wireless communications.

The at least one memory 110 can store protocols associated with facilitating aircraft navigation as discussed herein. Further, the at least one memory 110 can facilitate action to control communication between the system 100, other systems, and/or other devices, such that the system 100 can employ stored protocols and/or algorithms to achieve improved navigation as described herein.

It is noted that although the one or more computer executable components and/or computer executable instructions can be illustrated and described herein as components and/or instructions separate from the at least one memory 110 (e.g., operatively connected to the at least one memory 110), the various aspects are not limited to this implementation. Instead, in accordance with various implementations, the one or more computer executable components and/or the one or more computer executable instructions can be stored in (or integrated within) the at least one memory 110. Further, while various components and/or instructions have been illustrated as separate components and/or as separate instructions, in some implementations, multiple components and/or multiple instructions can be implemented as a single component or as a single instruction. Further, a single component and/or a single instruction can be implemented as multiple components and/or as multiple instructions without departing from the example embodiments.

It should be appreciated that data store components (e.g., memories) described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 112 can facilitate respective analysis of information related to aircraft navigation and/or movement. The at least one processor 112 can be a processor dedicated to analyzing and/or generating actions based on data received, a processor that controls one or more components of the system 100, and/or a processor that both analyzes and generates models based on data received and controls one or more components of the system 100.

Figure 2:
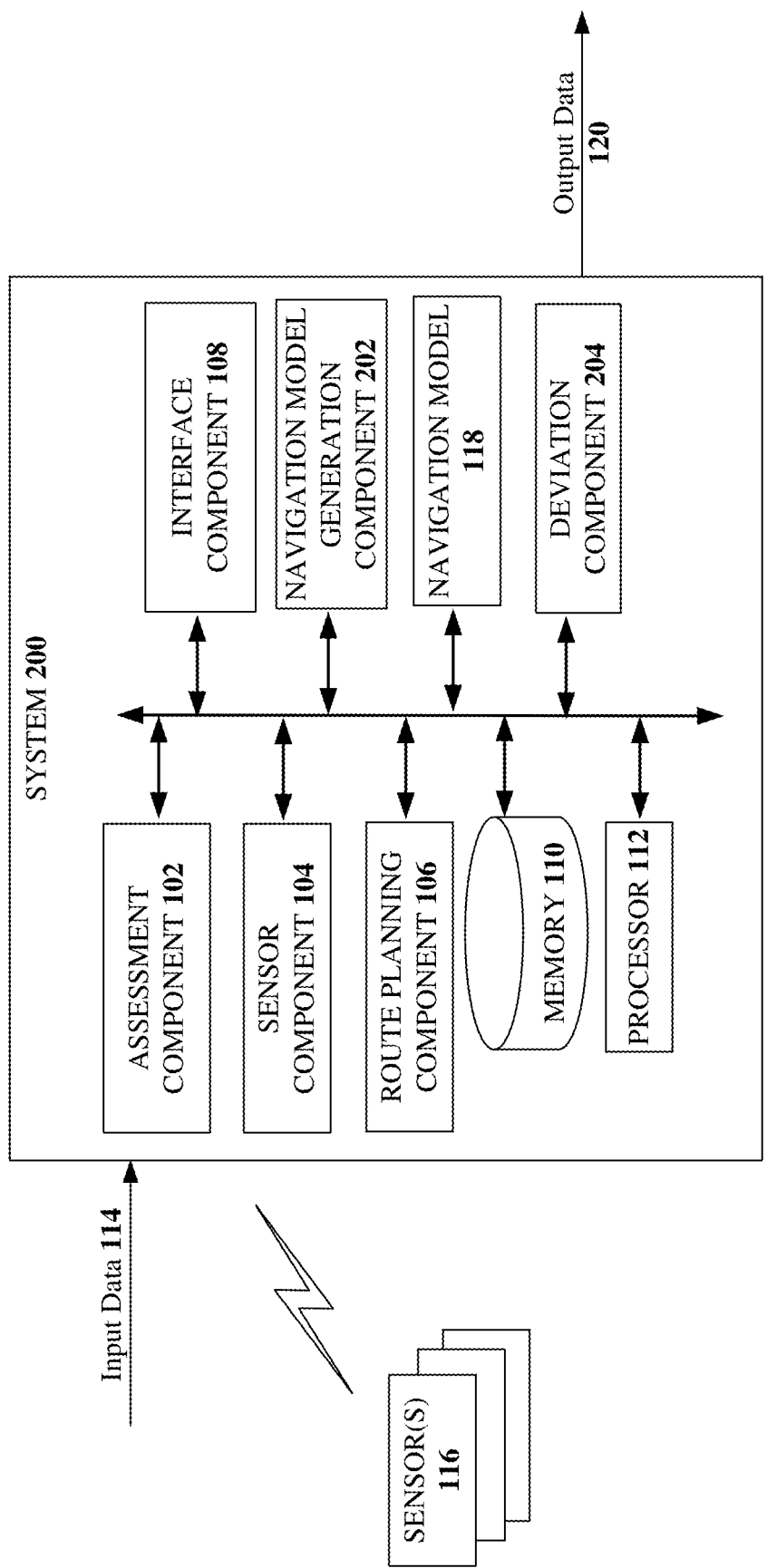
FIG. 2 illustrates another example, non-limiting, system for training a navigation model in accordance with one or more embodiments described herein.

FIG. 2 illustrates another example, non-limiting, system 200 for training a navigation model in accordance with one or more embodiments described herein. Repetitive description of like elements employed in other embodiments described herein is omitted for sake of brevity.

The system 200 can comprise one or more of the components and/or functionality of the system 100 and vice versa. The system 200 can comprise a navigation model generation component 202 that can generate the navigation model 118 based on operation data received from a plurality of aircraft. For example, data from one or more aircraft can be aggregated and used by the navigation model generation component 202 to train the navigation model 118. The data aggregated across the one or more aircraft can be useful since one or more aircraft might not have been utilized to fly into a particular airport previously, or might not travel to the airport frequently. Thus, information from the plurality of aircraft can be utilized to supplement data that can be gathered by a single aircraft. For example, a large corpus of airplane landing, taxiing, and airport navigation information can be utilized to train or generate the model. According to some implementations, the navigation model 118 can be further trained through cloud-based sharing across a plurality of models. For example, the models are not static but can be dynamically and constantly updated as new information is obtained. Accordingly, cross-learning can be facilitated across systems/models to allow accelerated learning and to share information (e.g., delays, obstructions on a runway/taxiway, unplanned runway/taxiway closures, emergency situations, and so on).

According to some implementations, the navigation model generation component 202 can train the navigation model 118 via cloud-based sharing across a plurality of models. For example, various aircraft and/or other systems that have information related to a defined airport can provide information about the airport over the cloud (e.g., cloud computing). The information can be retained in a database (e.g., in the cloud network) and can be assessed as needed when an aircraft is to land and/or depart from the airport. Such data can supplement the current data of the airport, as gathered by the one or more sensors 116.

The taxiing protocol determined by the route planning component 106 can include a route that could be more effective in terms of fuel savings, rather than a route that is the shortest distance. For example, the route planning component 106, or the navigation model 118, can evaluate the performance data of the aircraft, which can comprise a weight of the aircraft, a thrust of the aircraft, a fuel consumption of the aircraft, or combinations thereof. In addition, the route planning component 106, or the navigation model 118, can evaluate the respective conditions of the runway data and the taxiway data, which can comprise at least one of a weather condition, traffic information, obstruction information, restriction information, or combinations thereof. Based on the analysis, the route planning component 106, or the navigation model 118, can determine a route that should be taken in order to conserve fuel, decrease brake wear, and/or increase one or more other efficiencies of the aircraft.

According to some implementations, the system 200 can comprise a deviation component 204 that can dynamically reassess and update a route. In further detail, the system 200 can receive, as input data 114, detailed airport surface map data (e.g., information related to one or more taxiways with respective acceptable speeds and weights), aircraft performance data (including aircraft weight, thrust, fuel consumption), known runway conditions, inaccessible areas, required arrival time at gate, inputs from any collision or obstacle warning sensors that can be available (e.g., radar, Light Imaging, Detection, and Ranging (LIDAR), Autonomous Collision Avoidance System (ACAS), optical, and so on). For example, data received from radar or LIDAR can be utilized to identify where the runway is located and if there is anything located on the runway. According to some implementations, a camera or infrared camera can be utilized to determine if there are obstructions on the runway.

In accordance with some implementations, the input data 114 can include learned data. For example, the system 200 can learn the actual performance data of the aircraft, which can be different from the specification data (e.g., assumed performance data). Thus, rather than using the thrust data provided by a manufacturer of the engines, the system 200 can learn the amount of the thrust the engines installed on the aircraft actually provide with real (e.g., measured) fuel consumption.

The route planning component 106, based on the navigation model 118, can evaluate the assigned runway for landing and the assigned gate and, based on the evaluation, can plot a better or more optimal path by calculating segments with weighting for speed and changes in speed. Penalty factors can apply for any acceleration or deceleration that needs to occur. Further, the route planning component 106 can remove any segments that are inaccessible and recalculate as necessary. Optionally, the route planning component 106 can prepare alternates for non-optimal landing. Further, the route planning component 106 can monitor landing progress and identify where the aircraft has actually touched down. If at the threshold (e.g., will be able to use the assigned taxiway), execute as calculated. If long (e.g., will go past the taxiway), the deviation component 204 can determine whether to increase braking action to achieve original routing or use alternate routing (e.g., a different taxiway).

For example, "brake to vacate" (BTV) is a system that allows a pilot to pre-select stopping distance and speed for a chosen taxiway. BTV can calculate distance and can provide a warning if there is not sufficient runway available in wet/dry conditions. BTV can also provide brake settings that should be utilized to achieve the required stopping distance. As discussed herein, the various aspects can, based on available information (e.g., runway conditions, available/clear taxiways, taxiway speeds, destination gate), calculate brake settings rather than use a pilot estimation.

On the runway, the BTV passes control to a Runway Overrun Advisory and Alerting System (ROAAS)/Runway Overrun Protection. The ROAAS can provide monitoring of actual deceleration compared to runway length and can provide a warning or an indication to use maximum braking to prevent runway overrun. As discussed herein, the various aspects can compare flight performance with the model. If the aircraft touchdown is different than calculated (e.g., a non-optimal landing), calculate next optimal taxiway. Either to increase braking performance to achieve original taxiway or choose next optimal one (could skip one or more).

In addition, rather than determining a route based on a shortest distance, the various aspects provided herein can calculate routes based on performance of aircraft and find a most optimal route for performance. This can be a route with a minimal number of accelerations to avoid inertia of jet spooling up and associated fuel consumption. The route can also include elevation profiles, if applicable to the airport, and other factors that can decrease time to destination and/or reduce fuel consumption to destination.

Figure 3:
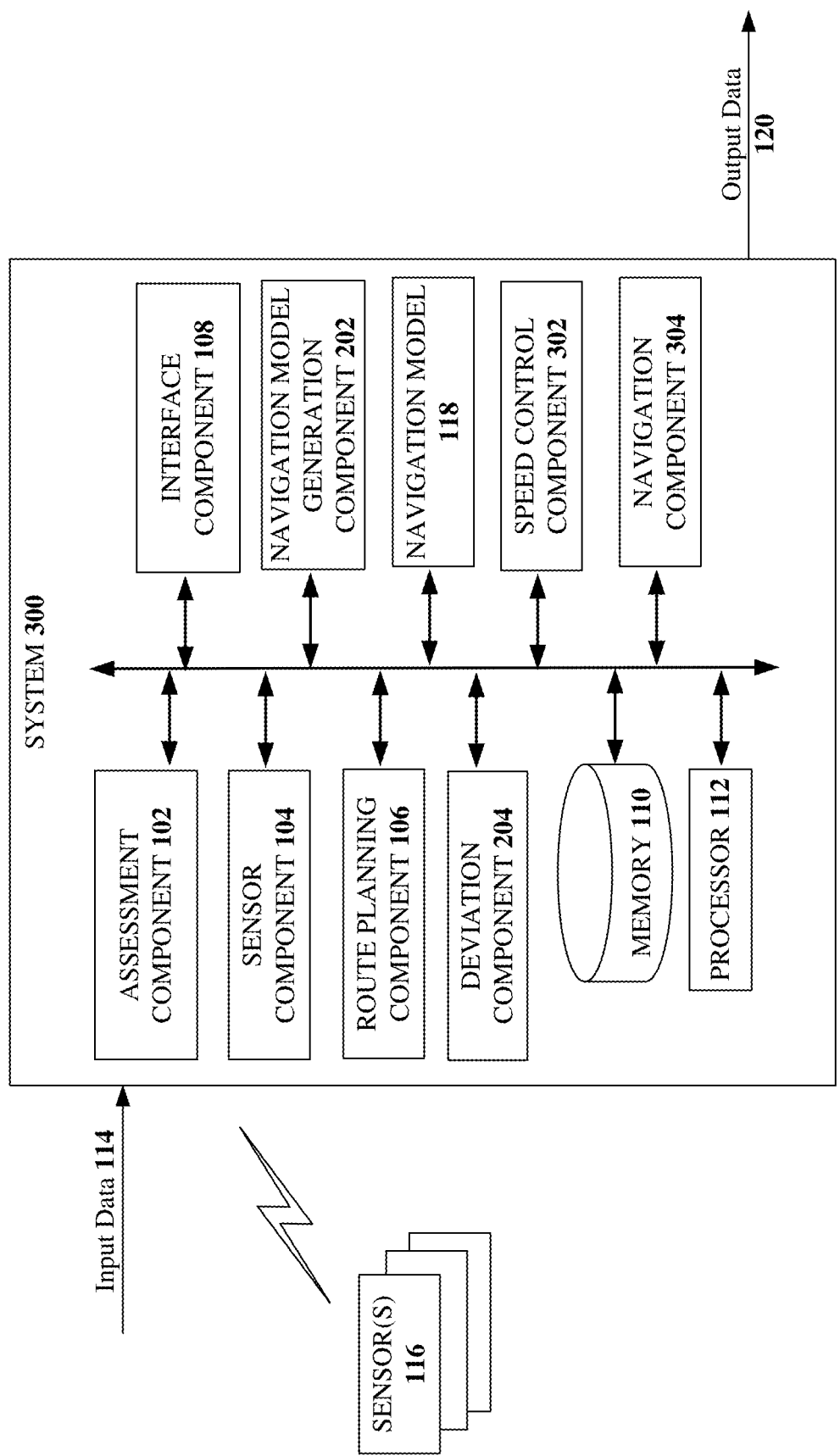
FIG. 3 illustrates another example, non-limiting, system for automated aircraft navigation and collision avoidance in accordance with one or more embodiments described herein.

FIG. 3 illustrates another example, non-limiting, system 300 for automated aircraft navigation and collision avoidance in accordance with one or more embodiments described herein. Repetitive description of like elements employed in other embodiments described herein is omitted for sake of brevity.

The system 300 can comprise one or more of the components and/or functionality of the system 100, the system 200, and vice versa. The system 300 can comprise a speed control component 302 that can perform acceleration and/or deceleration of the aircraft within the airport as a function of the taxiing protocol. According to some implementations, the speed control component 302 can regulate a braking action of the aircraft to minimize brake wear and increase a fuel efficiency, which can be performed consistently.

For example, the speed control component 302 can mitigate the number of times an engine has to "spool up" in order to accelerate. To perform the actual throttle control of the aircraft, there can be a delay between physically pushing the levers and creating the effect of acceleration. As compared to pushing a gas pedal in a vehicle and receiving a quick response, there can be a significant amount of delay from pushing the aircraft throttle forward and the aircraft moving. Accordingly, it can be difficult to obtain an optimal setting of thrust to achieve the speeds desired without pushing the throttle too far forward in order for the engines to "spool up" (or accelerate) to maximum. Thereafter, when the aircraft starts rolling, the throttle has to be pulled back because the aircraft is now going too fast. This manual operation can reduce fuel efficiency.

The speed control component 302 can utilize a closed loop control that can establish a thrust level so that the pilot can manually steer but does not have to control the speed of the aircraft. Thus, the flight management system (e.g., the speed control component 302) can connect to the throttle system that uses optimal settings to control the amount of thrust applied to "spool up" the engines while traversing the determined route. According to some implementations, if automatic speed control is not enabled, the speed control component 302 can provide guidance visually, audibly, or through other perceivable formats.

The system 300 can also comprise a navigation component 304 that can perform automated landing and steering of the aircraft within the airport as a function of the taxiing protocol. For example, the navigation component 304 can utilize the taxiing protocol determined by the route planning component 106 to automatically land and/or steer the aircraft on the ground. In some implementations, data from the one or more sensors 116 can be analyzed by the navigation component 304 during the automatic landing and steering of the aircraft to the defined gate or stopping location of the aircraft. Thus, if the aircraft has automatic steering capability, the routing can be utilized to automatically "drive" the aircraft to gate (or to the runway). According to some implementations, if automatic steering is not enabled, the navigation component 304 can provide guidance visually, audibly, or through other perceivable formats.

According to some implementations, the navigation component 304 can regulate braking action of the aircraft to minimize brake wear. The regulation of the braking action can be facilitated by the route planning component 106 when the route is determined and provided as the output data 120.

In some implementations, the navigation component 304 can interface with an electric aircraft tug in order to conserve fuel resources. For example, an electric aircraft tug can move an aircraft more efficiently because jet engines are not fuel efficient for moving the aircraft on the ground. Further, an electric aircraft tug can provide a torque that is at a high level sufficient to overcome the inertia of a heavy aircraft. In addition, an electric aircraft tug can recover energy when braking the aircraft. Thus, the navigation component 304 can wirelessly communicate with the electronic aircraft tug for autonomous steering of the aircraft. Thus, the flight management system (e.g., the navigation component 304) can provide instructions to the electronic aircraft tug, which can move the aircraft and perform the steering. When finished, the electronic aircraft tug can be utilized for another aircraft.

Figure 4:
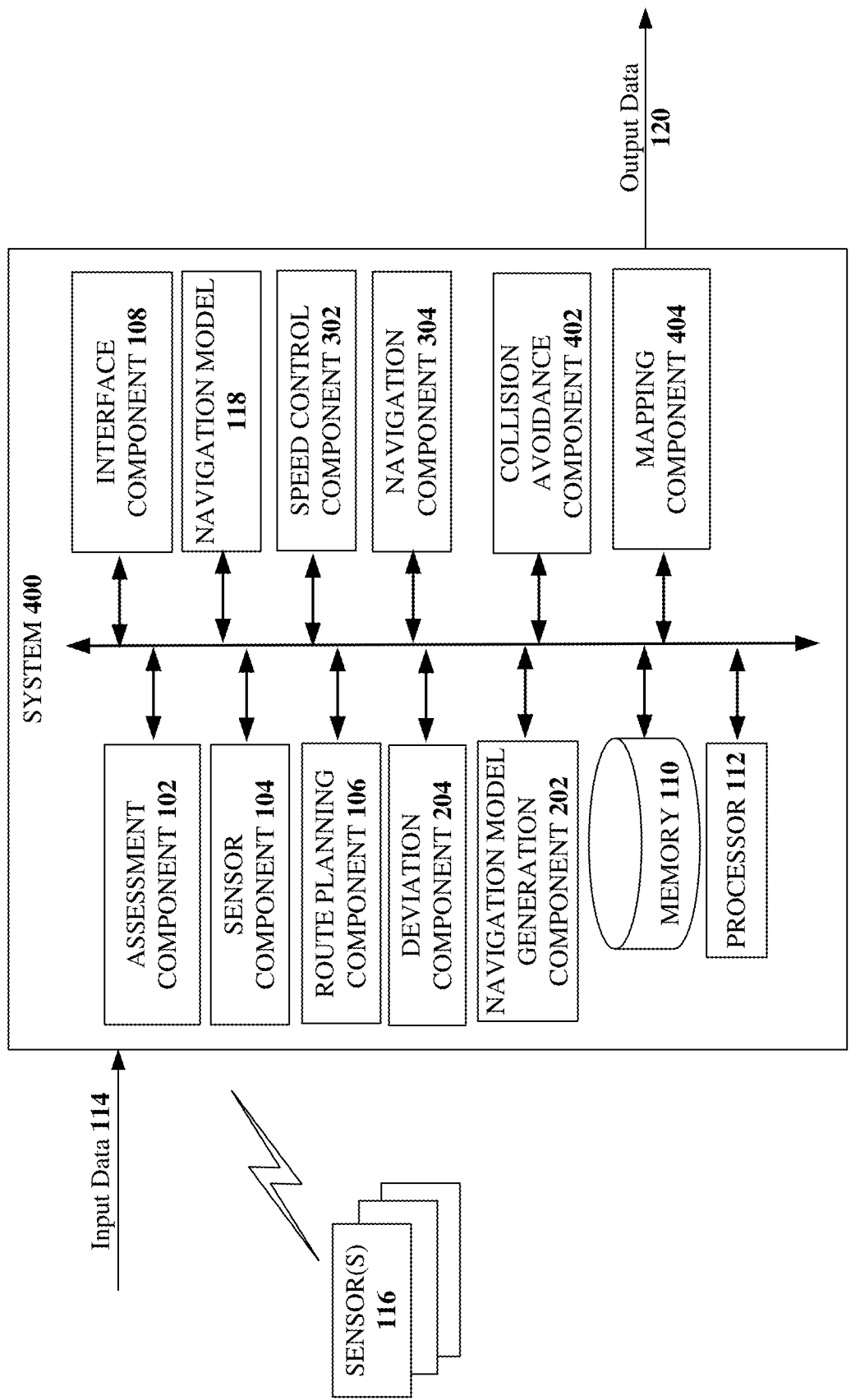
FIG. 4 illustrates another example, non-limiting, system for collision avoidance in accordance with one or more embodiments described herein.

FIG. 4 illustrates another example, non-limiting, system 400 for collision avoidance in accordance with one or more embodiments described herein. Repetitive description of like elements employed in other embodiments described herein is omitted for sake of brevity.

The system 400 can comprise one or more of the components and/or functionality of the system 100, the system 200, and/or the system 300, and vice versa. The system 400 can comprise a collision avoidance component 402 that can receive and generate data related to various conditions associated with a route being traversed within the airport. For example, the data received and generated by the collision avoidance component 402 can include, but is not limited to, airport, aircraft, environmental and aircraft operating factors. The collision avoidance component 402 can coordinate with the speed control component 302 and/or the navigation component 304 to mitigate collision of the aircraft with other objects. By way of example and not limitation, the objects can comprise people, vehicles, carts, luggage, debris, and so on.

The system 400 can also comprise a mapping component 404 that can facilitate routing and navigation of the aircraft to avoid hazardous areas, restricted areas, or other areas. For example, in an airport there can be certain zones that an aircraft is prohibited from entering based on a size of the aircraft, or one or more zones can be prohibited to all aircraft. The area or zone can be prohibited due to the chances of jet blast, which occurs when engine thrust is high (e.g., high exit velocity of air), which can occur when aircraft are being maneuvered (e.g., when turning from the gate to move towards the runway). This can also occur on or before takeoff and/or after landing. The jet blast produced can harm persons and/or objects that are located behind the aircraft. Other considerations can include noise abatement. In some implementations, jet blast can be mitigated through the use of electric aircraft tugs when pushing back from the gate and moving aircraft around the airport.

Accordingly, information related to the restricted areas can be provided to the mapping component 404, which can evaluate a route determined by the route planning component 106 for one or more restricted areas. If a restricted area is found on the route, a notification can be transmitted from the mapping component 404 to the route planning component 106 to alter the route. Accordingly, the aircraft can be prevented from entering the restricted areas, which can increase safety at the airport.

In some situations, a closure of a portion of the airport could be unforeseen (e.g., an accident, a fuel spill, traffic back-up, and so on) or could be known in advance (e.g., construction, maintenance, and so on). A digital broadcast can be transmitted and received by the system (e.g., the assessment component 102), especially in the case of unforeseen closures. Thus, the system can automatically determine an optimal route taking into account the newly received information.

According to some implementations, the planned route, the restricted zones, and/or other information can be rendered on the interface component 108. In some implementations, the pilot or another entity can interact with the interface component 108 to manually reconfigure the route or other aspects of the navigation and/or to request a change to the navigation.

In accordance with some implementations, the mapping component 404 can comprise data related to all major airports (and various non-major airports), gate configuration, runway mapping, taxiway mapping, and other information in an electronic map format. The mapping component 404 can communicate with the assessment component 102 and provide information related to a target airport (e.g., the airport under analysis). The mapping component 404 can receive explicit information about the airports and can infer information about those airports, or about other airports, based on information received from other systems/aircraft and/or via a cloud-based resource sharing network.

According to some implementations, the various systems can include respective interface components or display units (e.g., the interface component 108) that can facilitate the input and/or output of information to the one or more display units. The interface component 108, in an example, can be a "user friendly interface" such as an Electronic Flight Bag (EFB), which is an electronic information management device that helps facilitate flight management tasks.

By way of example and not limitation, a graphical user interface can be output on one or more display units and/or mobile devices as discussed herein, which can be facilitated by the interface component. A mobile device can also be called, and can contain some or all of the functionality of a system, subscriber unit, subscriber station, mobile station, mobile, mobile device, device, wireless terminal, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects can also be implemented with wired devices, or with both wired and wireless devices.

The display units (as well as other interface components discussed herein) can provide, a command line interface, a speech interface, Natural Language text interface, and the like. For example, a Graphical User Interface (GUI) can be rendered that provides a user with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it could be inferred that the user did want the action performed.

The user can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (EGA)) with limited graphic support, and/or low bandwidth communication channels.

Figure 5:
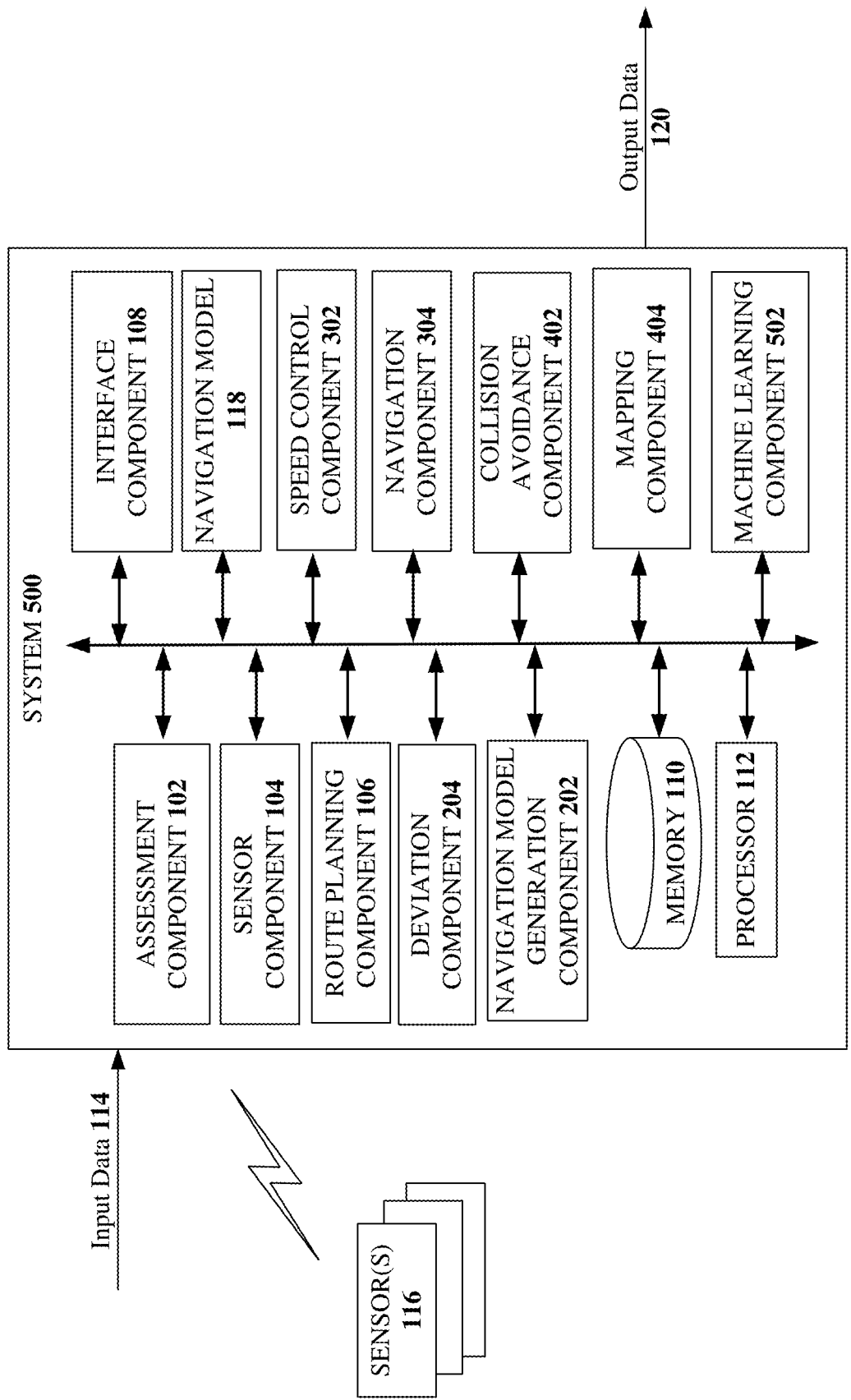
FIG. 5 illustrates another example, non-limiting, system for automating route planning and movement of an aircraft on the ground in accordance with one or more embodiments described herein.

FIG. 5 illustrates another example, non-limiting, system 500 for automating route planning and movement of an aircraft on the ground in accordance with one or more embodiments described herein. Repetitive description of like elements employed in other embodiments described herein is omitted for sake of brevity.

The system 500 can comprise one or more of the components and/or functionality of the system 100, the system 200, the system 300, and/or the system 400 and vice versa. The system 500 can include a machine learning and reasoning component 502, which can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 can employ principles of probabilistic and decision theoretic inference. Additionally, or alternatively, the machine learning and reasoning component 502 can rely on predictive models constructed using machine learning and/or automated learning procedures. Logic-centric inference can also be employed separately or in conjunction with probabilistic methods.

The machine learning and reasoning component 502 can infer a route that should be taken based on airport characteristics, aircraft characteristics, environmental conditions, operating conditions, and/or conditions of other aircraft and/or objects. According to a specific implementation, the system 500 can be implemented for onboard avionics of an aircraft. Further, the inferred route could be utilized to control a speed and/or a steering of the aircraft. Based on the knowledge, the machine learning and reasoning component 502 can train a model (e.g., the navigation model 118) to make an inference based on whether a route is acceptable or should be altered.

As used herein, the term "inference" refers generally to the process of reasoning about or inferring states of the system, a component, a module, the environment, and/or assets from a set of observations as captured through events, reports, data and/or through other forms of communication. Inference can be employed to identify a specific context or action, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with route planning and movement of an aircraft on the ground based on a navigation model trained to improve aircraft operational efficiency) can employ various artificial intelligence-based schemes for carrying out various aspects thereof. For example, a process for evaluating one or more scheduled paths and a current condition (e.g., aircraft landing too fast, landing conditions not as expected, obstacles on a taxiway, and so on) can be utilized to predict an alternative path that should be taken by the aircraft to improve one or more performance efficiencies of the aircraft, which can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to prognose or infer an action that should be implemented based on received operating conditions and current conditions, whether to selectively modify a recommended path, and so on. In the case of route planning and navigation, for example, attributes can be identification of previous routes based on historical information (e.g., the navigation model 118) and the classes can be criteria of how to interpret and implement one or more actions (e.g., speed control, steering) based on the route.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording gesture behavior in an unstable environment, by receiving extrinsic information (e.g., cloud-based sharing, and so on). For example, SVM's can be configured through a learning or training phase within a classifier constructor and feature selection module. Thus, a classifier(s) can be used to automatically learn and perform a number of functions, including but not limited to determining according to a predetermined criteria how to route an aircraft through an airport (e.g., taking into consideration a size of the aircraft and the space available at certain portions of the route (e.g., can the aircraft pass unobstructed through the area), whether a more efficient route can be traversed, changes to a route in real-time based on changing circumstances such as, for example, obstructions on the runway or taxiway, other aircraft movement and so forth.

Additionally, or alternatively, an implementation scheme (e.g., a rule, a policy, and so on) can be applied to control and/or regulate one or more routes that can be traversed by aircraft as well as the aircraft that are currently scheduled to traverse a define route. In some implementations, based upon a predefined criterion, the rules-based implementation can automatically and/or dynamically adjust a speed of the aircraft and/or steer the aircraft. In response thereto, the rule-based implementation can automatically interpret and carry out functions associated with the route planning and navigation based on a cost-benefit analysis and/or a risk analysis by employing a predefined and/or programmed rule(s) based upon any desired criteria.

Methods that can be implemented in accordance with the disclosed subject matter, will be better appreciated with reference to the following flow charts and/or the above routing diagrams. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks are required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram. According to some implementations, the methods can be performed by a system comprising a processor. Additionally, or alternatively, the method can be performed by a machine-readable storage medium and/or a non-transitory computer-readable medium, comprising executable instructions that, when executed by a processor, facilitate performance of the methods.

Figure 6:
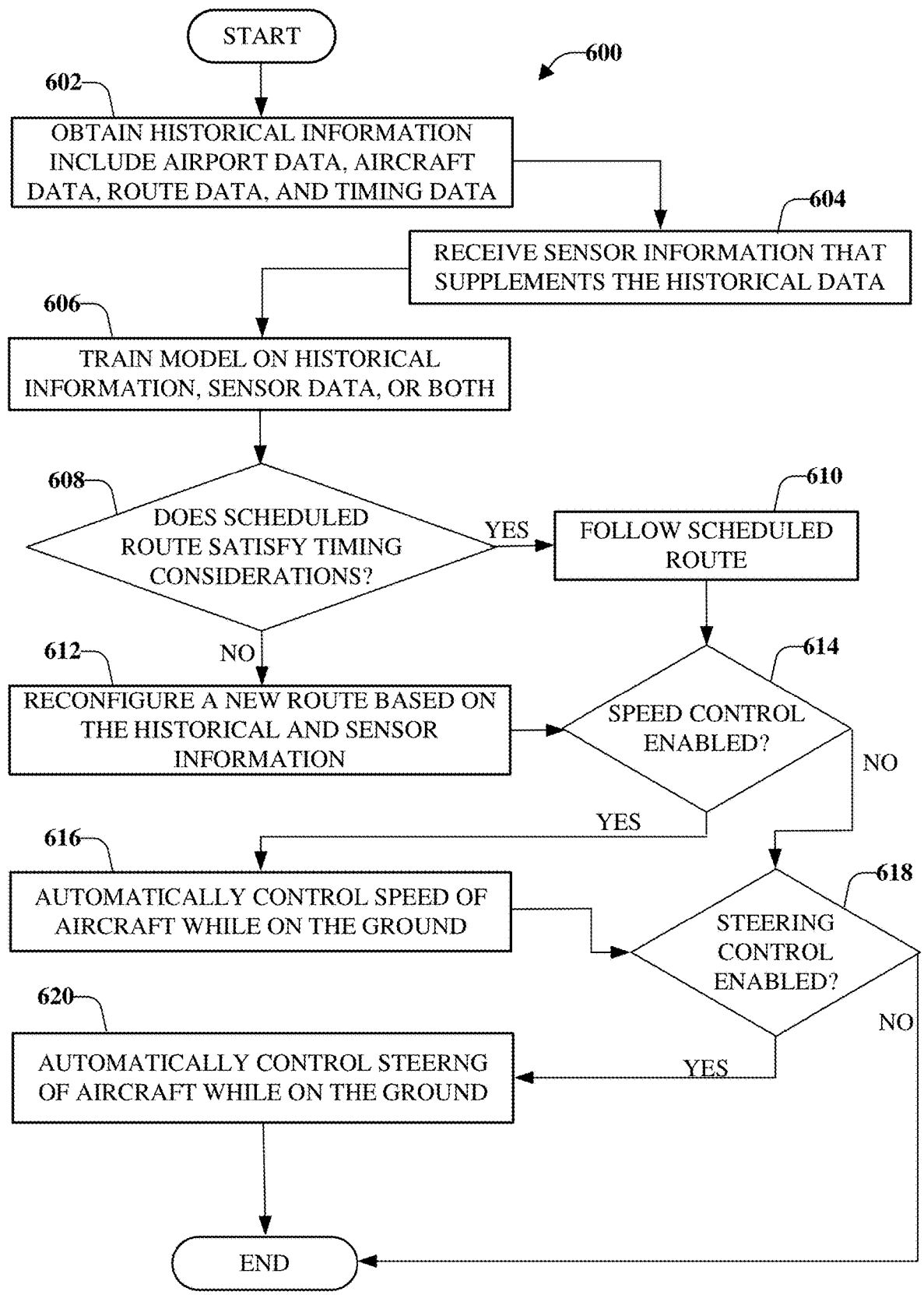
FIG. 6 illustrates an example, non-limiting, method for facilitating route planning and movement of an aircraft on the ground based on a navigation model trained to improve aircraft operational efficiency in accordance with one or more embodiments described herein.

FIG. 6 illustrates an example, non-limiting, method 600 for facilitating route planning and movement of an aircraft on the ground based on a navigation model trained to improve aircraft operational efficiency in accordance with one or more embodiments described herein. Repetitive description of like elements employed in other embodiments described herein is omitted for sake of brevity.

The method 600 starts, at 602, when historical information can be obtained (e.g., via the assessment component 102). The historical information can include airport data, aircraft data, route data, and timing data. For example, the airport data can include historical information related to the airport, such as information related to one or more runways, one or more taxiways, gate configuration, restricted areas, and so on. The aircraft data can include specifications associated with the aircraft such as weight, size, and engine parameters. The route data can include information related to an expected route. For example, if an aircraft is landing, the route data can include a runway on which the aircraft is landing and a taxiway expected to be taken by the aircraft after landing. In another example, the route data can include an expected route between a gate and the runway. The timing data can be an expected gate arrival time and/or an expected departure time.

At 604, sensor information can be received to supplement the historical data (e.g., via the sensor component 104). The sensor information can include parameters detected that are associated with the aircraft (e.g., a speed, a location, a landing condition, a current weight (including passengers and/or cargo), a fuel consumption, and so on). The sensor data can also include information related to the airport (e.g., amount of aircraft traffic active at the airport, unexpected closures of runways and/or taxiways, obstructions on a runway and/or taxiway, and so on).

At 606, a model is trained on the historical information, the sensor data, or both the historical information and the sensor data (e.g., via the navigation model generation component 202). According to some implementations, training the model can comprise training the model via cloud-based sharing across a plurality of models. In some implementations, training the model can be based on operating data received from one or more other aircraft. The operating data can be received via cloud-based sharing according to an implementation (e.g., a cloud computing network).

Based on the trained model, at 608, a determination is made whether the scheduled route will satisfy the timing criteria (e.g., via the route planning component 106). For example, the model can evaluate the scheduled route based on the timing criteria and based on one or more operational efficiencies (e.g., will the scheduled route conserve fuel while meeting the timing criteria). If the scheduled route will satisfy the timing criteria ("YES"), the method continues at 610, and the scheduled route is utilized.

If the scheduled route will not satisfy the timing criteria ("NO"), at 612, the route can be reconfigured based on the historical information and the sensor information (e.g., via the deviation component 204). For example, if the aircraft has landed and it is automatically determined that the braking action is not what was expected (e.g., as determined by the one or more sensors), the scheduled route can be recalculated and a new route reconfigured. In another example, if the aircraft lands farther down the runway than originally planned, the method can determine if it would be better to increase the braking action in order to use the originally planned taxiway, or if it would be better to take the next taxiway.

Upon or after determining (at 610) that the scheduled route should be utilized, or upon or after reconfiguration of the route (at 612), the method 600 continues, at 614, and a determination is made whether speed control of the aircraft has been enabled (e.g., via the speed control component 302). The speed control can further improve operating efficiencies, including fuel efficiency, of the aircraft. For example, by enabling the speed control, acceleration (e.g., throttling) and/or deceleration of the aircraft can be automatically controlled.

If speed control has been enabled ("YES"), at 616, speed of the aircraft can be automatically controlled (e.g., via the speed control component 302). If speed control has not been enabled ("NO"), or after the speed control is enabled, a determination can be made, at 618, whether steering of the aircraft has been enabled (e.g., via the navigation component 304). If steering of the aircraft has not been enabled ("NO"), the method 600 can end. If steering has been enabled ("YES"), at 620, steering control of the aircraft can be performed automatically (e.g., via the navigation component 304). According to some implementations, if automatic speed and/or automatic steering is not enabled, outputs can be rendered (e.g., visible, audible, and so on) that provide guidance related to the speed and/or steering.

Thus, the method 600 (as well as other aspects disclosed herein) can provide gate-to-gate (e.g., gates of a same airport, gates of different airports) navigation solutions. Also provided can be increased automation of aircraft control (e.g., speed control, steering control) to improve efficiency and safety. Further, through recalculation and optimization of one or more routes, planning for airlines can be improved as well as reduced operational costs.

Figure 7:
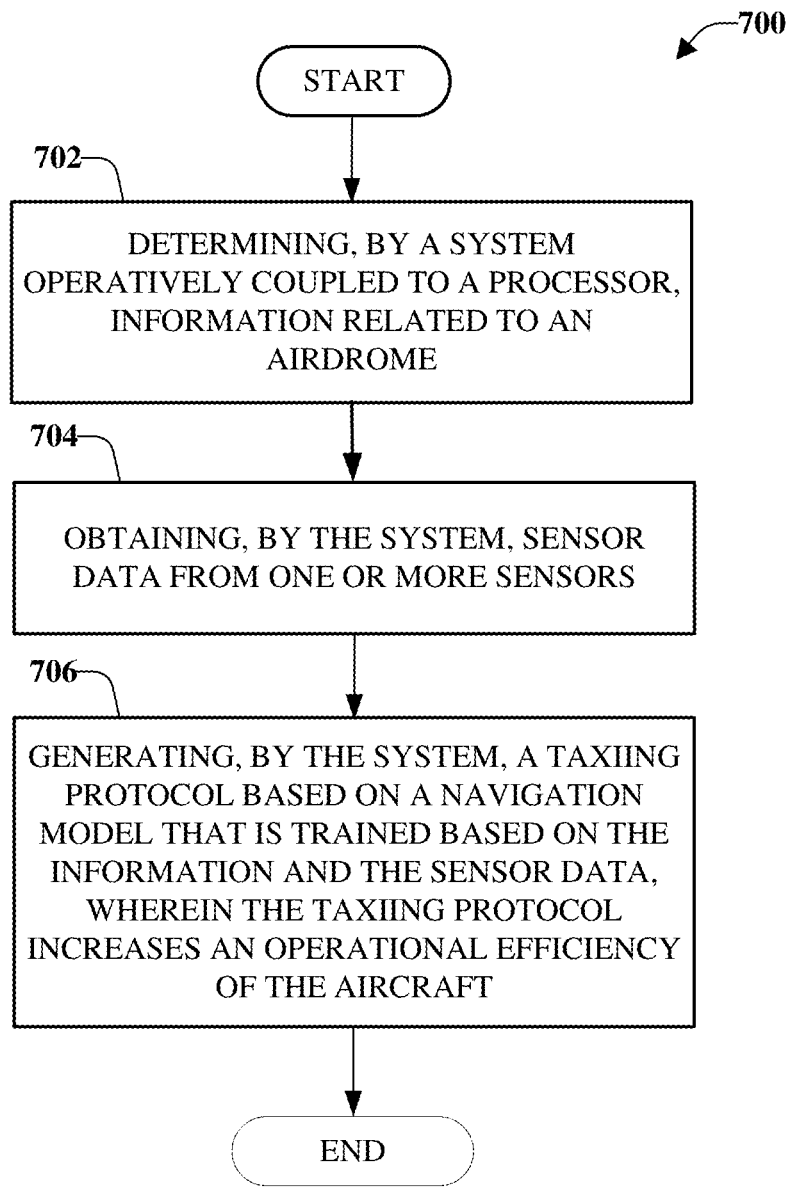
FIG. 7 illustrates a method for route planning of an aircraft on the ground in accordance with one or more embodiments described herein.

FIG. 7 illustrates a method 700 for route planning of an aircraft on the ground in accordance with one or more embodiments described herein. Repetitive description of like elements employed in other embodiments described herein is omitted for sake of brevity.

At 702, the method 700 can include determining, by a system operatively coupled to a processor, information related to an airdrome (e.g., via the assessment component 102). The information can comprise first data associated with a runway of the airdrome, second data associated with a taxiway of the airdrome, and gate configuration of the airdrome. According to some implementations, the data can include, but is not limited to, detailed airport surface map information (e.g., information related to all taxiways and associated speeds and weights), known runway conditions, inaccessible areas (e.g., restricted areas), and/or any required arrival time at gate. In some implementations, aircraft information can also be provided such as, for example, aircraft performance data, which can include aircraft weight, thrust, and fuel consumption. In addition, inputs from a collision or obstacle warning system that are available (e.g., LIDAR, radar, ACAS, optical, and so on) can be provided.

Sensor data can be obtained by the system from one or more sensors, at 704 (e.g., via the sensor component 104). The one or more sensors can comprise a first sensor that monitors performance data of an aircraft, a second sensor that monitors a first condition of the runway, a third sensor that monitors a second condition of the taxiway, and a fourth sensor that monitors a third condition of the gate configuration.

Further, at 706, the system can generate a taxiing protocol based on a navigation model that can be trained based on the information and the sensor data. The taxiing protocol can increase an operational efficiency of the aircraft (e.g., via the route planning component 106). According to some implementations, generating the taxiing protocol can comprise determining, by the system, a time of arrival at a destination with the airdrome. The destination can be a defined gate or a defined runway.

The method 700 can also comprise generating the navigation model based on operation data received from a plurality of aircraft. In some implementations, the method 700 can include training the navigation model based on cloud-based sharing across a plurality of models.

According to an implementation, the method can comprise dynamically adjusting, by the system, an acceleration and/or a deceleration of the aircraft within the airdrome as a function of the taxiing protocol. Further to this implementation, the method can comprise minimizing, by the system, brake wear and increasing a fuel efficiency of the aircraft based on regulation of a braking action during the acceleration and the deceleration. In an additional or alternative implementation, the method can comprise steering, by the system, the aircraft within the airdrome based on the taxiing protocol and based on an avoidance of regulated portions of the airdrome.

Further, in accordance with some implementations, the method can include generating, by the system, data related to the airdrome, the aircraft, and aircraft operating factors. Further to these implementations, the method can include coordinating, by the system, a movement of the aircraft within the airdrome to mitigate collision with one or more objects during an automated steering of the aircraft.

According to some implementations, the method can include generating the navigation model based on operation data received from a plurality of aircraft. In some implementations, the method can include training the navigation model through cloud-based sharing across a plurality of models.

Figure 8:
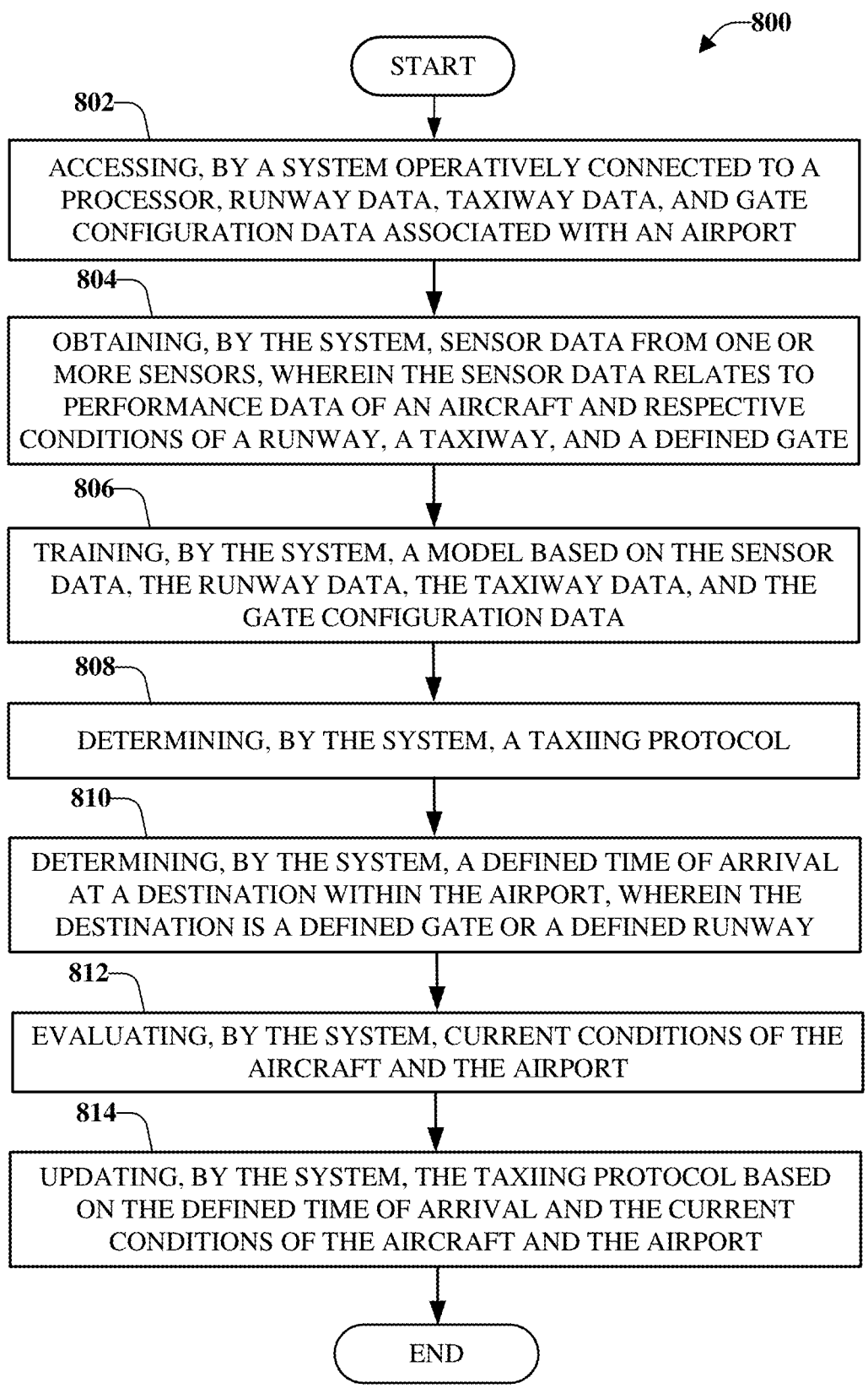
FIG. 8 illustrates a method for route planning and movement of an aircraft on the ground in accordance with one or more embodiments described herein.

FIG. 8 illustrates a method 800 for route planning and movement of an aircraft on the ground in accordance with one or more embodiments described herein. Repetitive description of like elements employed in other embodiments described herein is omitted for sake of brevity.

Gate to gate navigation is desired for improved planning and reduction of errors in human factors. Airlines face large pressures for operating costs (e.g., delays, fuel expenses). The various aspects provided herein facilitate automated planning by providing detailed estimates of arrival and can reduce fuel usage by avoiding accelerations through unnecessary decelerations as well as navigating optimally along taxiways. The various aspects also cater for non-optimal landings to find a next most efficient routing rather than a static braking distance calculated from assumed landing position. Errors can be reduced by ensuring that paths are clear of obstacles (e.g., maintenance work, crossing traffic, not striking buildings on sides) as well as allowing for optimizing automatic steering and/or speed control (when sensors and controls are available).

The method 800 starts, at 802, when a system operatively connected to a processor accesses runway data, taxiway data, and gate configuration data associated with an airport (e.g., via the assessment component 102). At 804, the system can obtain sensor data from one or more sensors (e.g., via the sensor component 104). The sensor data can relate to performance data of an aircraft and respective conditions of a runway, a taxiway, and a defined gate. The sensor data can provide real-time or near real-time information.

Based on the sensor data, the runway data, the taxiway data, and the gate configuration data, the system can train a model, at 806 (e.g., via the navigation model generation component 202). At 808, the system can determine a taxiing protocol (e.g., via the route planning component 106). The aircraft can be navigated within the airport based on the taxiing protocol. Further, the taxiing protocol can increase an operational efficiency of the aircraft.

Further, the method 800 can comprise determining, by the system, a defined time of arrival at a destination within the airport, at 810 (e.g., via the route planning component 106). The destination can be a defined gate or a defined runway. For example, the defined time can be a time that the aircraft is expected at the gate (e.g., for unloading/loading of passengers/cargo). In another example, the defined time can be a takeoff time that specifies when the plane should be at the runway and ready for takeoff.

At 812, the system can evaluate current conditions of the aircraft and the airport (e.g., via the sensor component 104).

At 814, the taxiing protocol can be updated based on the defined time of arrival and the current conditions of the aircraft and the airport (e.g., via the route planning component 106).

Figure 9:
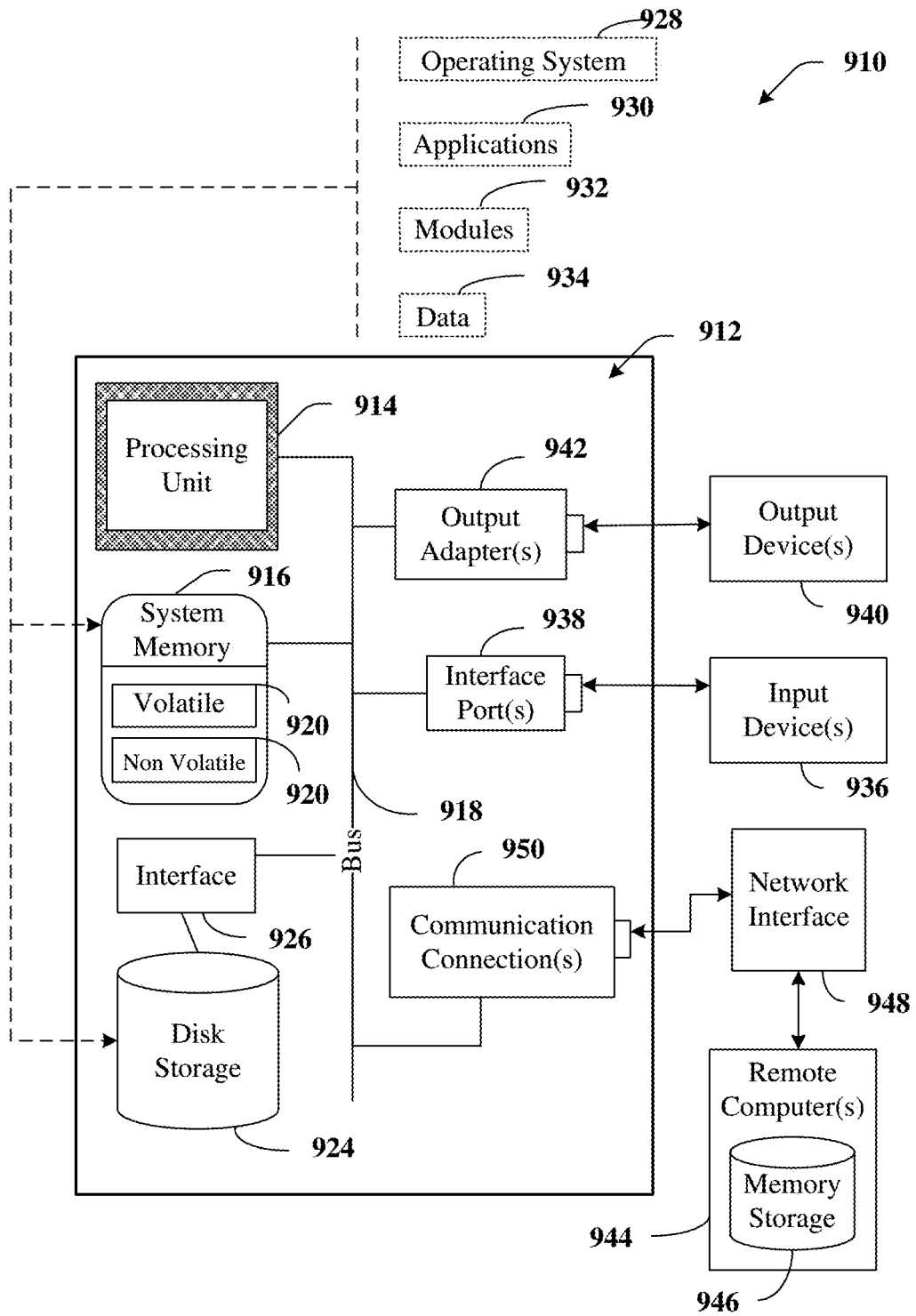
FIG. 9 illustrates an example, non-limiting, computing environment in which one or more embodiments described herein can be facilitated.
Figure 10:
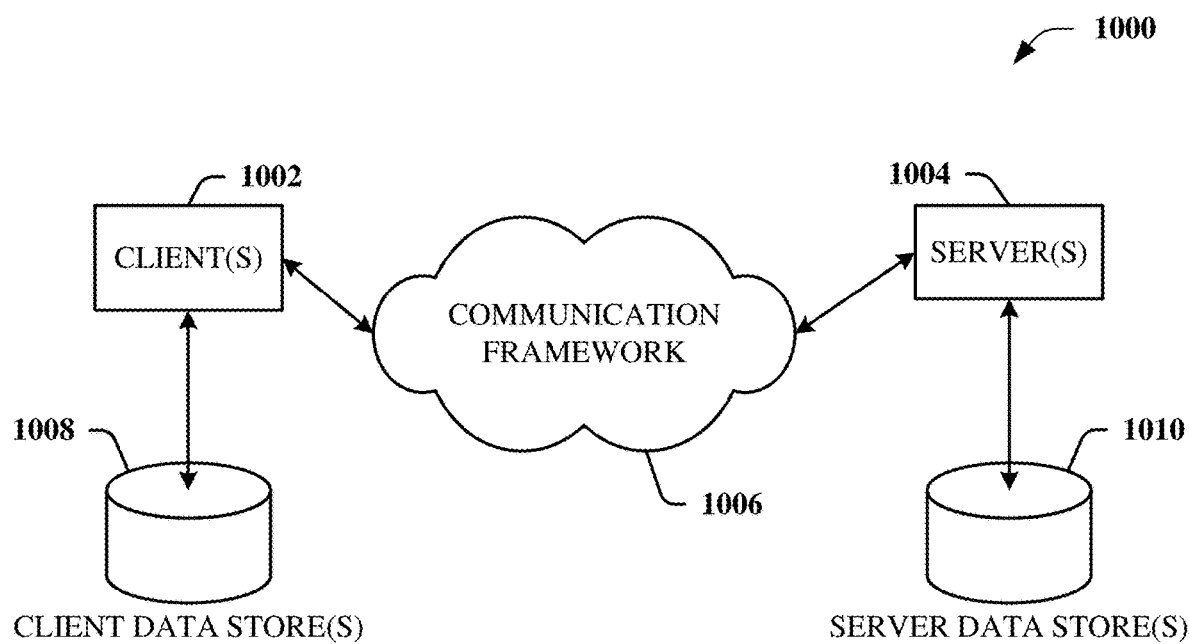
FIG. 10 illustrates an example, non-limiting, networking environment in which one or more embodiments described herein can be facilitated.

In order to provide a context for the various aspects of the disclosed subject matter, FIGS. 9 and 10 as well as the following discussion are intended to provide a brief, general description of a suitable environment in which the various aspects of the disclosed subject matter can be implemented.

With reference to FIG. 9, an example environment 910 for implementing various aspects of the aforementioned subject matter includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable PROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor-based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a processor; and
    a memory that stores executable instructions that, when executed by the processor, facilitate performance of operations, comprising:
        training a model based on surface map data of an airport and sensor data obtained from a group of sensors via a cloud-based network, wherein the sensor data relates to data of a first aircraft and current conditions of the airport and is provided by at least a second aircraft via the cloud-based network; and
        determining a navigation protocol for the first aircraft based on the model and the surface map data of the airport, wherein the first aircraft is navigated within the airport based on the navigation protocol.

2. The system of claim 1, wherein the determining the navigation protocol comprises:
    determining a time of arrival at a destination for the first aircraft;
    evaluating current conditions of the first aircraft and the airport; and
    updating the navigation protocol based on the time of arrival and the current conditions.

3. The system of claim 1, wherein the sensor data is first sensor data, and wherein the operations further comprise:
    receiving second sensor data from the group of sensors; and
    changing a route of the first aircraft based on the second sensor data, wherein the navigation protocol comprises the route.

4. The system of claim 3, wherein the changing the route comprises:
    determining a performance-based optimization of the route; and
    changing the route based on the performance-based optimization comprises considerations other than shortest path.

5. The system of claim 1, wherein the operations further comprise:
    detecting an unexpected action based on the sensor data; and
    recalculating a scheduled route of the navigation protocol based on the unexpected action.

6. The system of claim 1, wherein the determining the navigation protocol comprises:
    calculating respective segments of alternative routes based on respective weights associated with changes in speed for the respective segments of the alternative routes resulting in calculated segments; and
    selecting a route from the alternative routes based on the calculated segments.

7. The system of claim 6, wherein the calculating the segments comprises applying penalty factors during the calculating for expected acceleration or expected deceleration for respective segments of the alternative routes.

8. The system of claim 1, wherein the sensor data relates to performance data of the first aircraft and respective conditions of a runway, a taxiway, and a defined terminal.

9. The system of claim 1, wherein at least one sensor of the group of sensors is a light imaging, detection, and ranging sensor.

10. A method, comprising:
training, by a system comprising a processor, a model based on surface map data of an airport and based on sensor data obtained from a group of sensors via a cloud-based resource sharing network, wherein the sensor data relates to data of a first aircraft and conditions of the airport and is provided by at least a second aircraft via the cloud-based resource sharing network; and
determining, by the system, a navigation protocol for the first aircraft based on the model and the surface map data of the airport, wherein the first aircraft is navigated within the airport based on the navigation protocol.

11. The method of claim 10, wherein the cloud-based resource sharing network comprises aggregated sensor data from one or more aircraft including the first aircraft and the second aircraft.

12. The method of claim 11, wherein the aggregated sensor data supplements the sensor data associated with the first aircraft.

13. The method of claim 10, further comprising:
determining, by the system, a defined time of arrival at a destination for the first aircraft;
evaluating, by the system, current conditions of the first aircraft and the airport; and
updating, by the system, the navigation protocol based on the defined time of arrival and the current conditions.

14. The method of claim 10, further comprising:
facilitating, by the system, an acceleration or a deceleration of the first aircraft based on the navigation protocol.

15. The method of claim 10, further comprising:
facilitating, by the system, a braking action of the first aircraft based on a determination of a brake wear and a fuel efficiency of the first aircraft.

16. The method of claim 10, further comprising:
facilitating, by the system, automated steering of the first aircraft based on the navigation protocol.

17. A computer readable storage device comprising executable instructions that, in response to execution, cause a system comprising a processor to perform operations, the operations comprising:
a navigation model trained via cloud-based sharing across a plurality of models based on a plurality of sensor data obtained from a plurality of aircraft associated with an airport and based on surface map data of the airport, wherein the plurality of sensor data is obtained via the cloud-based sharing, and wherein sensor data of the plurality of sensor data comprises current conditions of the airport; and
a route planning component that employs the navigation model and the surface map data of the airport for generation of a protocol to navigate the plurality of aircraft within the airport based on respective time of arrivals at respective destinations within the airport for the plurality of aircraft.

18. The computer readable storage device of claim 17, wherein the operations further comprise:
facilitating at least one of an acceleration or a deceleration of an aircraft of the plurality of aircraft based on the protocol.

19. The computer readable storage device of claim 17, wherein the operations further comprise:
facilitating a braking action of an aircraft of the plurality of aircraft based on brake wear and fuel efficiency.

20. The computer readable storage device of claim 17, wherein the operations further comprise:
facilitating automated steering of an aircraft of the plurality of aircraft based on the protocol.

* * * * *